US010744419B2

(12) United States Patent
Xia

(10) Patent No.: US 10,744,419 B2
(45) Date of Patent: Aug. 18, 2020

(54) MODULAR PANEL INTERLOCKING AND REINFORCING MECHANISM FOR BUILDING ENCLOSURES

(71) Applicant: Qun Xia, Weston, FL (US)

(72) Inventor: Qun Xia, Weston, FL (US)

( * ) Notice: Subject to any disclaimer, the term of this patent is extended or adjusted under 35 U.S.C. 154(b) by 113 days.

(21) Appl. No.: 15/619,431

(22) Filed: Jun. 9, 2017

(65) Prior Publication Data

US 2018/0353872 A1 Dec. 13, 2018

(51) Int. Cl.

| | |
|---|---|
| A63H 33/04 | (2006.01) |
| A63H 33/06 | (2006.01) |
| E04B 1/61 | (2006.01) |
| A47B 47/04 | (2006.01) |
| E04H 1/12 | (2006.01) |
| E04C 2/38 | (2006.01) |

(Continued)

(52) U.S. Cl.
CPC ......... *A63H 33/062* (2013.01); *A47B 47/042* (2013.01); *B65D 11/1873* (2013.01); *E04B 1/6104* (2013.01); *E04C 2/38* (2013.01); *E04H 1/1205* (2013.01); *B65D 11/00* (2013.01); *E04B 1/12* (2013.01); *E04B 2001/6195* (2013.01); *F16B 5/0056* (2013.01); *F16B 5/0614* (2013.01); *F16B 5/0635* (2013.01); *F16B 5/126* (2013.01)

(58) Field of Classification Search
CPC ...... A63H 33/04; A63H 33/044; A63H 33/00; A63H 33/086; A63H 33/08; A63H 33/084; A63H 33/105; A63H 33/102
USPC ......... 446/105, 111, 116, 120, 121, 476, 478
See application file for complete search history.

(56) References Cited

U.S. PATENT DOCUMENTS

| | | | | |
|---|---|---|---|---|
| 2,135,437 A | * | 11/1938 | Bangert | E04B 7/028 |
| | | | | 52/82 |
| 2,142,420 A | * | 1/1939 | Sullivan | A22C 25/14 |
| | | | | 452/119 |

(Continued)

*Primary Examiner* — Kien T Nguyen
(74) *Attorney, Agent, or Firm* — Mark C. Johnson; Johnson Dalal

(57) ABSTRACT

The modular panel 20 interlocking and reinforcing mechanism for building enclosures pertains to assembling boxes 21 with six of the same or similar modular panels 20 without extra components or connectors. My mechanism joins modular panels 20 by interlocking both grooves 22 attached by living hinges 24 on the panel edges, thus creating the box 21.

The embodiment of my mechanism joins modular panels 20 by interlocking both grooves 22 attached by living hinges 24 on the panel edges, thus creating the box 21. The living hinges 24 allow all the grooves 22 to turn forty five degrees at the corners. Upon interlocking both grooves 22 to each other at a forty five degree angle, it completes the ninety degree dihedral angle transition from one panel 20 to another for corners. Another embodiment of my mechanism is to assemble a box 21 in expanded sizes by using the same or similar modular panels 20 without extra accessories. Modular panels are connected side by side to expand the flat surface or transitioning to a ninety degree angle at the box corners. An additional embodiment of my mechanism includes similar sized reinforcing rods 30 embedded in the interlocked grooves 26, which allows them tightly interlock together and strengthen the box 21. One type of the interlocking groove 22 mentioned above is round with a narrower outer opening than the inner width.

12 Claims, 15 Drawing Sheets

(51) Int. Cl.
*B65D 6/24* (2006.01)
*E04B 2/18* (2006.01)
*B65D 6/00* (2006.01)
*F16B 5/06* (2006.01)
*F16B 5/00* (2006.01)
*E04B 1/12* (2006.01)
*F16B 5/12* (2006.01)

(56) References Cited

U.S. PATENT DOCUMENTS

| | | | | |
|---|---|---|---|---|
| 2,960,254 A * | 11/1960 | Kiba | E05D 7/1077 | 16/DIG. 13 |
| 3,184,013 A * | 5/1965 | Pavlecka | E04C 2/08 | 52/275 |
| 3,203,149 A * | 8/1965 | Soddy | F16B 5/008 | 52/127.5 |
| 3,249,284 A * | 5/1966 | Wood | B65D 65/22 | 206/434 |
| 4,050,604 A * | 9/1977 | Flanders | B65D 7/24 | 206/599 |
| 4,083,464 A * | 4/1978 | Burnett | B65D 7/24 | 217/13 |
| 4,230,227 A * | 10/1980 | Kowall | B65D 5/446 | 206/600 |
| 4,470,647 A * | 9/1984 | Bishoff | F16B 5/07 | 312/108 |
| 4,491,231 A * | 1/1985 | Heggeland | B65D 21/02 | 206/509 |
| 4,685,892 A * | 8/1987 | Gould | A63H 33/062 | 446/109 |
| 4,793,507 A * | 12/1988 | Delplanque | B65D 9/14 | 217/13 |
| 4,836,787 A * | 6/1989 | Boo | A63H 33/048 | 434/403 |
| 4,874,341 A * | 10/1989 | Ziegler | A63H 33/08 | 446/109 |
| 5,016,813 A * | 5/1991 | Simons | B65D 5/4287 | 229/189 |
| 5,123,533 A * | 6/1992 | Uitz | A47B 87/0276 | 206/386 |
| 5,197,404 A * | 3/1993 | Haley | B63B 21/00 | 114/267 |
| 5,429,259 A * | 7/1995 | Robin | B65D 9/06 | 217/65 |
| 5,466,058 A * | 11/1995 | Chan | A47B 47/0075 | 312/107 |
| 5,509,720 A * | 4/1996 | Croom | A47C 13/005 | 297/181 |
| 5,555,989 A * | 9/1996 | Moran, Jr. | H02B 1/40 | 220/3.94 |
| 5,632,071 A * | 5/1997 | Maunder | A41F 1/00 | 24/580.1 |
| 5,715,948 A * | 2/1998 | Hung | A47B 81/068 | 206/308.1 |
| 5,743,421 A * | 4/1998 | Gonzalez | B65D 11/1873 | 217/13 |
| 5,749,512 A * | 5/1998 | Gingras-Taylor | B65D 5/445 | 206/459.5 |
| 5,871,384 A * | 2/1999 | Kichijo | A63H 33/062 | 446/112 |
| 5,888,114 A * | 3/1999 | Slocum | A47B 47/0075 | 446/118 |
| 5,979,693 A * | 11/1999 | Bane, III | B65D 81/3825 | 220/23.9 |
| 6,004,182 A * | 12/1999 | Pasin | A63H 33/10 | 135/119 |
| 6,648,159 B2 * | 11/2003 | Prutkin | B65D 11/1866 | 220/4.28 |
| 8,387,856 B1 * | 3/2013 | Lachance | B65D 5/6655 | 206/738 |
| 8,584,858 B2 * | 11/2013 | Golias | B65D 81/056 | 206/320 |
| 8,668,542 B2 * | 3/2014 | Bruzgul | A63H 23/10 | 114/264 |
| 8,763,811 B2 * | 7/2014 | Lantz | B65D 25/16 | 206/584 |
| 8,863,473 B2 * | 10/2014 | Weber | E04F 15/02 | 52/589.1 |
| 2002/0092787 A1 * | 7/2002 | Cheng | B65D 11/1893 | 206/459.5 |
| 2002/0193046 A1 * | 12/2002 | Zebersky | A63H 3/52 | 446/476 |
| 2003/0098256 A1 * | 5/2003 | Lu | B65D 11/1833 | 206/511 |
| 2004/0232145 A1 * | 11/2004 | Antal, Sr. | B65D 11/1873 | 220/4.33 |
| 2005/0223652 A1 * | 10/2005 | Mower | E04B 1/34321 | 52/79.1 |
| 2008/0066393 A1 * | 3/2008 | Sorensen | A63H 33/101 | 52/81.1 |
| 2008/0124008 A1 * | 5/2008 | Meager | A44B 19/16 | 383/63 |
| 2012/0175377 A1 * | 7/2012 | Masci | B65D 7/24 | 220/615 |
| 2016/0194068 A1 * | 7/2016 | Savian | E06B 3/805 | 160/213 |

\* cited by examiner

MODULAR PANEL INTERLOCKING AND REINFORCING MECHANISM FOR BUILDING ENCLOSURES

BACKGROUND—PRIOR ART

The following is tabulation of some prior art that presently appears relevant:

U.S. Patents

| Pat. No. | Kind Code | Issue Date | Patentee |
| --- | --- | --- | --- |
| 2,960,254 | 220/31 | Nov. 15, 1960 | Kiba |
| 3,184,013 | 189/34 | May 18, 1965 | Pevlecka |
| 3,203,149 | 52/593 | Aug. 31, 1965 | Soddy |
| 3,249,284 | 229/40 | May 3, 1966 | Wood |
| 4,050,604 | 220/4 F | Sep. 27, 1977 | Flanders |
| 4,083,464 | 217/13 | Apr. 11, 1978 | Burnett |
| 4,230,227 | 206/600 | Oct. 28, 1980 | Kowall et al. |
| 4,470,647 | 312/111 | Sep. 11, 1984 | Bishoff |
| 4,491,231 | 220/6 | Jan. 1, 1985 | Heggeland et al. |
| 4,793,507 | 217/13 | Dec. 27, 1988 | Delplanque |
| 5,016,813 | 229/189 | May 21, 1991 | Simons |
| 5,123,533 | 206/386 | Jun. 23, 1992 | Uitz |
| 5,429,259 | 217/65 | Jun. 4, 1995 | Robin |
| 5,466,058 | 312/111 | Nov. 14, 1995 | Chan |
| 5,555,989 | 220/62 | Sep. 17, 1996 | Moran, Jr. |
| 5,632,071 | 24/573.7 | May 27, 1997 | Maunder |
| 5,743,421 | 220/4.28 | Apr. 28, 1998 | Gonzalez et al. |
| 5,749,512 | 229/199 | May 12, 1998 | Gingras-Taylor |
| 5,888,114 | 446/128 | Mar. 30, 1999 | Slocum et al. |
| 5,979,693 | 220/592.2 | Nov. 9, 1999 | Bane |
| 6,648,159 | 220/4.28 | Nov. 18, 2003 | Prutkin et al. |
| 8,387,856 | 229/123 | Mar. 5, 2013 | Lachance et al. |
| 8,584,858 | 206/586 | Nov. 19, 2013 | Golias |
| 8,763,811 | 206/584 | Jul. 1, 2014 | Lantz |
| 8,863,473 | 52/745.2 | Oct. 21, 2014 | Weber |

U.S. Patent Application Publications

| Publication Nr. | Kind Code | Publ. Date | Applicant |
| --- | --- | --- | --- |
| US20020092787 A1 | 206/459.5 | Jul. 18, 2002 | Cheng |
| US20020193046A1 | 446/476 | Dec. 19, 2002 | Zebersky |
| US20030098256 | 206/511 | May 29, 2003 | Lu |
| US20040232145 A1 | 220/4.33 | Nov. 25, 2004 | Antal et al. |
| US20050223652 A1 | 52/79.1 | Oct. 13, 2005 | Mower et al. |
| US20120175377 A1 | 220/621 | Jul. 12, 2012 | Masci |

Foreign Patent Documents

| Foreign Doc. Nr. | Cntry Code | Kind Code | Pub. Dt | App or Patentee |
| --- | --- | --- | --- | --- |
| EP0408622 | DE | E04B1/61 | 1993 Feb. 17 | Thomas Sorensen |
| 05-170261 | GB | B65D 71/12 | 1993 Jul. 9 | Marie Philippe |
| 05-201449 | JP | B65D 6/28 | 1993 Aug. 10 | Ozaki Seiji |
| 06-064639 | GB | B65D 5/42 | 1994 Mar. 8 | Milliens Andre |
| 11-222937 | JP | E04B 1/343 | 1999 Aug. 17 | Kiyono Fumio |
| 2002-065422 | JP | A47F 5/10 | 2002 Mar. 5 | Hirano Fumiisa |
| CN03225707.4 | CN | B65D6/24 | 2004 Aug. 4 | Yizhong Chen |
| CN200820201784.4 | CN | B65D6/24 | 2009 Aug. 26 | Kaizhi Hong |
| 2010-088624 | JP | A47B 47/00 | 2010 Apr. 22 | O Keisho |
| CN201664394U | CN | A61G17/00 | 2010 Dec. 8 | Yonghai Fei |
| 2142420 | EP | B62D 29/04 | 2011 Sep. 7 | Walter Boersma |
| 2013-056686 | JP | B65D 6/24 | 2013 Mar. 28 | Fujimoto Futoshi |
| 2015-067345 | JP | B65D 81/38 | 2015 Apr. 13 | Kawakami et al. |
| AU20150903545 | AU | E04B1/61 | 2015 Aug. 31 | Parsons et al. |
| CN201520114229.8 | CN | B65D6/24 | 2015 Sep. 16 | Ke Yi |
| 2016-132492 | JP | B65D 6/18 | 2016 Jul. 25 | Shimamoto Satoshi |
| 1020167021115 | KR | F16B 12/125 | 2016 Sep. 13 | Dereloev et al. |

Cardboard boxes have been prevalent in the packaging industry since its patent in 1856 and rose to prominence as a shipping material in the 1870s. Corrugated cardboard boxes are light weight compared to Wooden boxes, thus being more convenient to handle and print for packaging and protecting commodities.

For packaging heavy items or stacking heavy items, corrugated cardboard boxes may not be suitable and can become deformed due to their inadequate endurance to mechanical stresses. Cardboard has a number of drawbacks, including costs, strength in humid conditions, and increasing numbers that cause environmental degradation.

Even though it is indispensable to our daily lives, the cardboard box goes largely unappreciated. Cardboard is used to ship over 90 percent of all products in the US. More than 100 billion cardboard boxes are produced in the United States alone every year, weighing approximately 40 million tons. The fastest-growing contributors to the pile of cardboard are e-commerce companies and the number is only expected to grow as online shopping continues to surge.

Cardboard is the single largest component of municipal solid waste around the world. It is estimated that over 24 million tons of cardboard is discarded each year. When paper decomposes, it emits methane gas which is dozens more toxic than $CO_2$.

Each ton of cardboard paper produced consumes 17 trees, 380 gallons of oil, 7000 gallons of water, 4,000 kWh of energy, and 9 cubic yards of landfill space.

There is a limited resource of trees in the world and we need every last one of them to preserve suitable oxygen levels, reduce carbon dioxide, and help maintain the rain formation cycle in the world. Trees produce oxygen and protect the planet from further global warming. The 17 trees that would be saved could absorb a total of 250 pounds of carbon dioxide from the air each year while producing enough oxygen for 51 people.

Combining all the energy consumed, more than one ton of $CO_2$ emissions could be reduced for every ton of cardboard that we do not produce. There is no doubt that deforestation and desertification are contributing to the deterioration of the environment, climate, and the habitat of this planet. We are facing crucial challenges to mitigate these adverse processes for future generations and become more eco-friendly. Every step in the manufacturing process of cardboard also produces tons of hazardous gasses that are emitted into the air every day. Pulp and paper is one of the largest industrial polluters to air, water, and land worldwide.

While recycling cardboard boxes can help, it still requires half the time and energy it takes to make a brand new box, which makes recycling cardboard in bulk a time-consuming and inefficient solution to a more severe problem. Avoiding the production of cardboard in the first place is more effective than recycling it.

The growing focus and pressing challenge towards sustainability by businesses and consumers are not only the environmental benefits but also the cost advantages. Cardboard boxes will last for a limited time depending on the weight and shapes of the items, adverse weather, faulty transportation, etc. One solution to tackle this environmental issue is to utilize reusable packaging products. Reusable packaging containers are made from stronger materials, allowing them to last 20 years and replace over 100 cardboard boxes in their lifetime. Durable and cost-efficient reusable packaging products can reduce storage and shipping costs for companies in almost any industry.

Paper generates 50 times more water pollutants and 70 percent more air pollutants during production than plastics. In terms of greenhouse gas emissions and energy, plastic is preferable to paper and cardboard—it takes 90 percent less energy to recycle a pound of plastic than a pound of paper. There are many advantages to using plastics over paper when it comes to transporting goods. Plastics could be used to make the panels under my panel interlocking mechanism.

As alternative to cardboard boxes, reusable boxes are easily cleaned, collapsible, and reusable. It is an economically feasible tool that has been used for many years. Due to complex channels in the market, returning reusable boxes to the supplier is getting more complicated. They are not interchangeable, particularly when the boxes are made to specific dimensions or standards.

For those collapsible alternatives to cardboard boxes, the sizes cannot be adjusted to Different specifications. In addition, courier services and delivery companies price the shipping costs based on guidelines of dimensional packaging from the higher of the two measurements: package weight or package size. Storing numerous boxes for many businesses and individuals is not realistic due to the area the boxes occupy.

For businesses that are using routine transportation routes to deliver products, Cardboard boxes that are only used once or twice result in major expenses for business operations. Reusable boxes can cut down enormous costs for this type of business.

Consumers who receive their shipments from e-commerce companies usually discard the cardboard boxes. The boxes come in a variety of sizes, possibly containing protective materials for the product. Although consumers may keep some boxes at home, shipping items becomes problematic when the items do not match the sizes of the cardboard boxes.

My panel interlocking mechanism allows modular panels to be produced in standard sizes, assembled to standard-size boxes, and disassembled for easy storage. Since all the panels are in modular specifications and standard sizes, the panels can be circulated, stored, cleaned, recycled, and reused. For all businesses and individual consumers, the most important benefit in adopting the modular interlocking panel boxes is to significantly reduce packaging costs due to the reusable features.

One reason cardboard boxes are popular is because people like clean and disposable boxes. My mechanism designs smooth and sleek surfaces all over the panels. After each usage, if they get dirty, individual consumers can easily rinse and dry them. For industries under specific regulations, my design is suitable for centralized washing and drying.

My mechanism presents the simplest designs using modular panels to build and expand surfaces. For example, U.S. Pat. No. 8,863,473 (2014), U.S. Pat. No. 5,979,693 (1999), U.S. Pat. No. 5,743,421 (1998), U.S. Pat. No. 5,429,259 (1995), U.S. Pat. No. 4,470,647 (1984), U.S. Pat. No. 4,050,604 (1977) all introduced panel interconnection methods; some designs are limited to creating a single sized box; some mechanism require thick panels to make it interlock; some designs need panels in a variety of sizes; while others require additional accessories to hold the box together. All the methods and panels mentioned above have limitations for wide usage and circulation in the society.

The following U.S. Pat. No. 5,888,114 (1999), U.S. Pat. No. 5,466,058 (1995), U.S. Pat. No. 5,123,533 (1992), U.S. Pat. No. 3,203,149 (1965), U.S. Pat. No. 3,184,013 (1965) are becoming more complicated. The tedious work required for the assembling these boxes deters consumers' interest in the packaging. The configurations of panels are so uneven or irregular that they're not fit for easy cleaning.

Another major mechanism for reusable boxes is collapsible boxes. For example, U.S. Pat. No. 6,648,159 (2003), U.S. Pat. No. 5,555,989 (1996), U.S. Pat. No. 4,793,507 (1988), U.S. Pat. No. 4,491,231 (1985), U.S. Pat. No. 3,249,284 (1966) are all devices that require all major pieces to connect before folding up. The configurations are predetermined before connecting the pieces into an enclosure, therefore limiting the applications to unitary product transportations. Their blueprints are not as simple and compact as my designs, and the interchangeability in reusing boxes mentioned above is obviously restricted.

None of the methods or devices mentioned above could help consumers use simple modular panels with my mechanism to assemble and dissemble reusable boxes in various sizes and dimensions. Additionally, none of the existing methods is suitable for mass production under industrial standards, accepted to circulate and reuse as an alternative to cardboard boxes in society, or mitigate environmental concerns.

Based on the previous shortcomings of assembling and dissembling enclosures or boxes from panels, components, and collapsible devices, my mechanism discloses a far more efficient and practical way for alternatives. This type of panel in my design is versatile for building boxes in a plurality of sizes and dimensions, allowing the consumer to use panels in the minimal number of dimensions to meet their specifications. Furthermore, my mechanism can extend to other applications such as furniture and assembly toys, partitions, makeshift houses, etc.

SUMMARY

Cardboard boxes are used extensively throughout the package industry; ninety percent of all products are packed using cardboard boxes. Producing cardboard boxes requires enormous amounts of natural resources such as trees, fresh water, and energy. Even though a great percentage of cardboard boxes are recycled, it still takes half the amount of all the resources compared to producing new cardboard. The process of producing cardboard and decomposition in landfills emits harmful pollutants to air, water, and soil. Finding an alternative to cardboard boxes is crucial to become more ecofriendly and preserve our habitat.

Predecessors have made many attempts to replace or substitute the hundreds of billions of cardboard boxes produced each year. However, the existing replacements are limited to several business fields, none of which have been successful in establishing their design nationwide. Their products are not versatile and cannot be interchangeable, widely circulated, or reused.

Generally speaking, the ideal alternative to cardboard boxes should be easily assembled and disassembled. Consumers should be able to create a box at their own discretion without difficulty and machinery should mass produce, assemble, and dissemble them without difficulty as well.

A primary example of my mechanism is using one type of panel to build boxes of multiple sizes. Rectangular panels comprise of a sheet rolled groove along each edge. The groove consists of an opening with a smaller outer width toward the opening compared to the inner width of the grooves. All the grooves on the panels have the same configuration. Regarding assembly, two grooves from separate panels can be pressed into one another. The grooves are made at the desired flexibility and will adjust depending on the attachment or removal from a separate panel. When attached, groove A is held by groove B with a smaller width of the outer opening and both sides of the groove opening which point inward.

My modular panel interlocking mechanism designs a living hinge along the groove, thus allowing grooves on both connecting panels to turn 45 degrees and interlock to complete the 90 degree dihedral angled connection for the box. Six same sized panels with a 90 degree corner interlocking all 12 corner lines complete the box construction.

Another example is to allow the panel groove and living hinge to stretch straight to connect to another panel. A bigger surface can be constructed by interlocking a panel and a groove. When creating a 90 degree corner, turn the living hinges on both panels and interlock them together. Repeat the steps to complete the box.

One of the advantages of groove interlocking is that both grooves will stay interlocked due to their flexibility and tension. If a similar sized cross rod is inserted into and along the groove, the entire structure will be more durable. As such, the grooves either on the flat surface or on the dihedral corners between the panels are reinforced by this design. Another reinforcing method is simply adding a third groove onto or into the existing interlocked grooves. In the case of trihedral corners on the boxes, a specifically made right angled trihedral corner piece, with rods protruding along three dihedral corner lines, can be pressed onto or into the trihedral corners. The three right angled rods' protrusion will simultaneously lock into the three grooves from the trihedral corner, thus reinforcing the box corners. For more resistant connections, fasteners or bolts can be used to permanently anchor the grooves together with extra strength. The reinforcing benefits in my mechanism greatly strengthen the enclosures with only a few accessories.

Because my mechanism uses panels to build enclosures, it can also apply to other variations aside from boxes. Assembly toys, for example, can use the interlocking and reinforcing method to create buildings, toy vehicles and crafts, toy figures and characters, etc. Additionally, my method can be applied to furniture because of its flat surface and dihedral corner compositions. The wood joinery can be replaced with my interlocking methods, as well as extending reinforcing rods downwards as supporting legs to the floor. Other applications that can use my mechanism include crates, containers, makeshift houses, partitions, tents, show booths, rescue shelters, interior decorations, flat surface expansions, and many others.

DRAWINGS—FIGURES

In the drawings, closely related figures have the same number but different alphabetic suffixes.

FIG. 1A is an elevated view of six identical panels before and after its assembly into a box. Each panel comprises of four grooves and four living hinges attached to every side. Corresponding panel grooves from two panels interlock and eventually form a six sided enclosed box.

Figure 15:
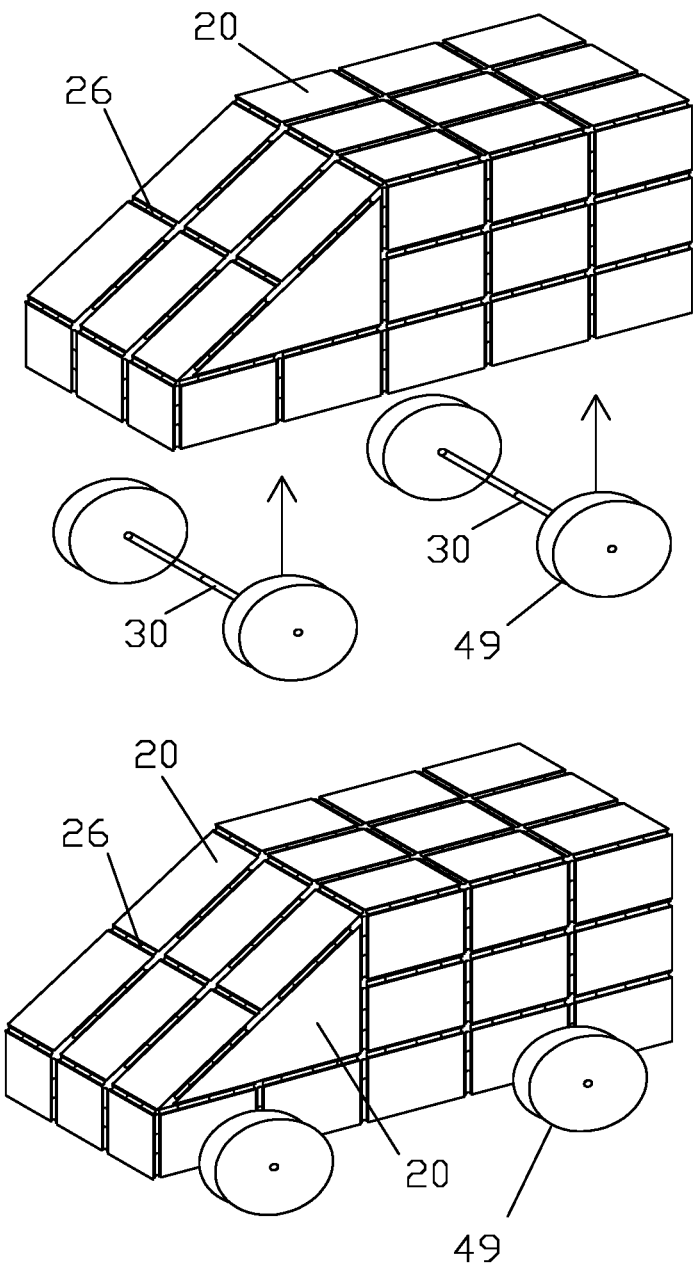

FIG. 15 is an elevated view of an assembled toy vehicle with modular panels attached with interlocking grooves. The reinforcing rods are connected with toy wheels on both ends. The reinforcing rods are also embedded in interlocked grooves as vehicle wheel shafts.

DRAWINGS—REFERENCE NUMERALS

| | |
|---|---|
| 20 panel | 21 box |
| 22 groove or round groove | 23 triangle groove |
| 24 living hinge | 25 rectangle groove |
| 26 interlocked grooves | 28 flexible panel |
| 29 tubular case | 30 reinforcing rod |
| 32 reinforcing groove | 34 cross reinforcing rod |
| 36 trihedral corner reinforcing piece | 40 panel with insulation or cushion |
| 42 air cushions | 44 panel oval opening or box handle |
| 46 corner piece with grooves | 48 toy vehicle wheel |

DETAILED DESCRIPTION

Figure 1A:
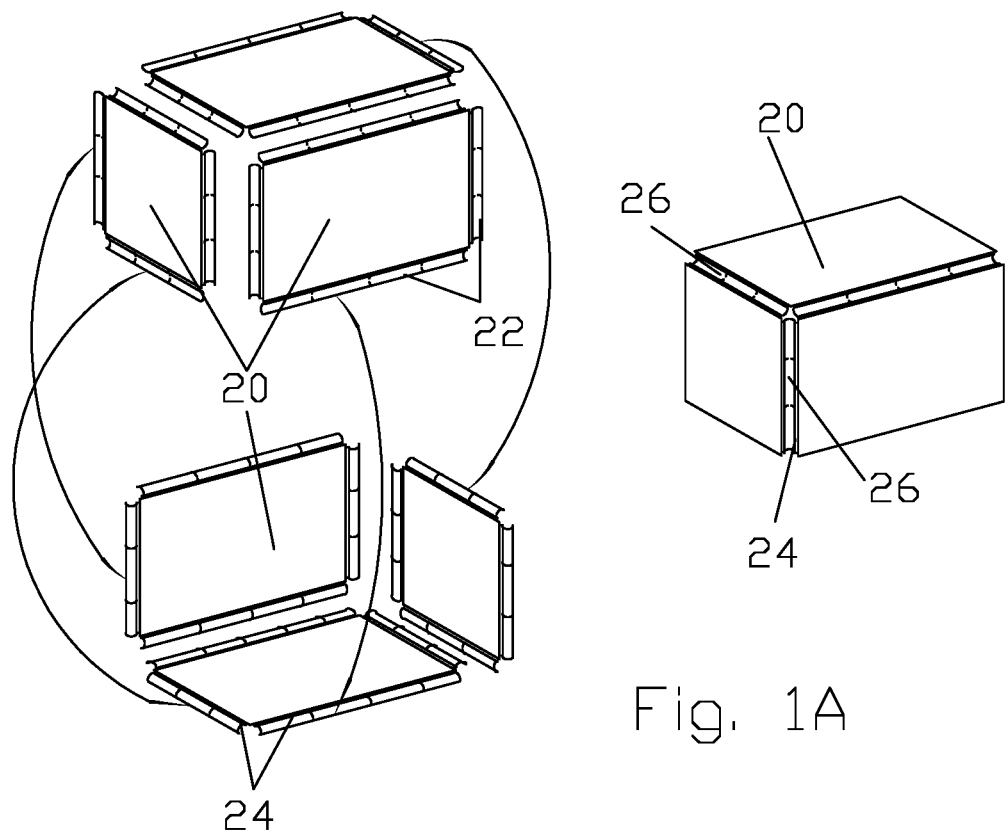
FIG. 1B is a cross section view of four identical panels before and after assembly into a square enclosure.
Figure 1B:
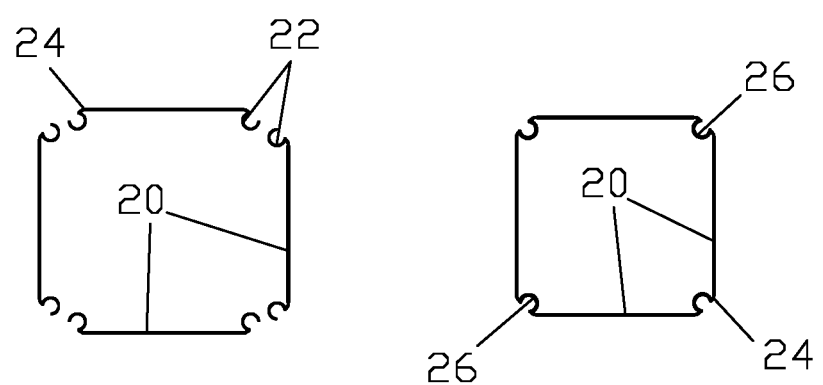

One embodiment of my modular panel 20 interlocking mechanism is illustrated in FIG. 1A and FIG. 1B. One rectangular box 21 comprises of six sides, which includes four identical sides forming a four sided right angle dihedral enclosure and two other identical sides that close at the both ends of the enclosure. The rectangular box 21 comprises of twelve dihedral corner lines, eight trihedral corners, and six plat sides. In this case, if each side of the box 21 is taken apart as an individual piece of panel, there are four modular panels 20 in the same size and two other modular panels 20 that are also same size.

One cubic box 21 which is not illustrated in both FIG. 1A and FIG. 1B, but similar to the rectangle box 21 mentioned above, comprises of six identical sides, twelve dihedral corner lines of the same length, eight trihedral corners, and six identical sides. In this case, if each side of the box 21 is taken apart as an individual piece of panel 20, there are six modular panels 20 of the same size.

FIG. 1A discloses four modular panels 20 in one size and two modular panels 20 in another size which are placed accordingly at the positions of the top, the front, and the left in a group; the back, the bottom, and the right are in another group before the assembly into the box 21. Every edge on each panel 20 is attached with an identical groove 22 connected with a living hinge 24. All the panels 20 are also positioned with groove openings facing outward before assembly. Corresponding edges and grooves on each panel 20 are pressed into each other to interlock. Twenty four grooves are pressed into the corresponding twelve interlocked grooves 26 along twelve dihedral corner lines on the box 21. Due to living hinges 24 connecting grooves and panel edges, dihedral corner interlocked grooves 26 are bent at forty five degree angles from each panel 20 and pressed locked in each other at the forty five degree angles to complete the transition of a ninety degree angle from one panel 20 to another. Due to the elevated view, only three sides, the top, the front, the left, three interlocked grooves 26, and living hinges 24 on the assembled box 21 are visible in FIG. 1A.

FIG. 1B is cross sectional view that discloses four modular panels with grooves 22 connected by living hinges 24 that interlock to each other, bent at a forty five degree angle from each panel 20. The forty five degree angle on each side of the living hinge 24 completes the total ninety degree angle transition from one panel 20 to another, thus forming a ninety degree dihedral corner between adjacent panels 20. By finishing all four corners of interlocking grooves 26, a square enclosure in a cross sectional view is built with modular panels 20 in a simple way.

Figure 2:
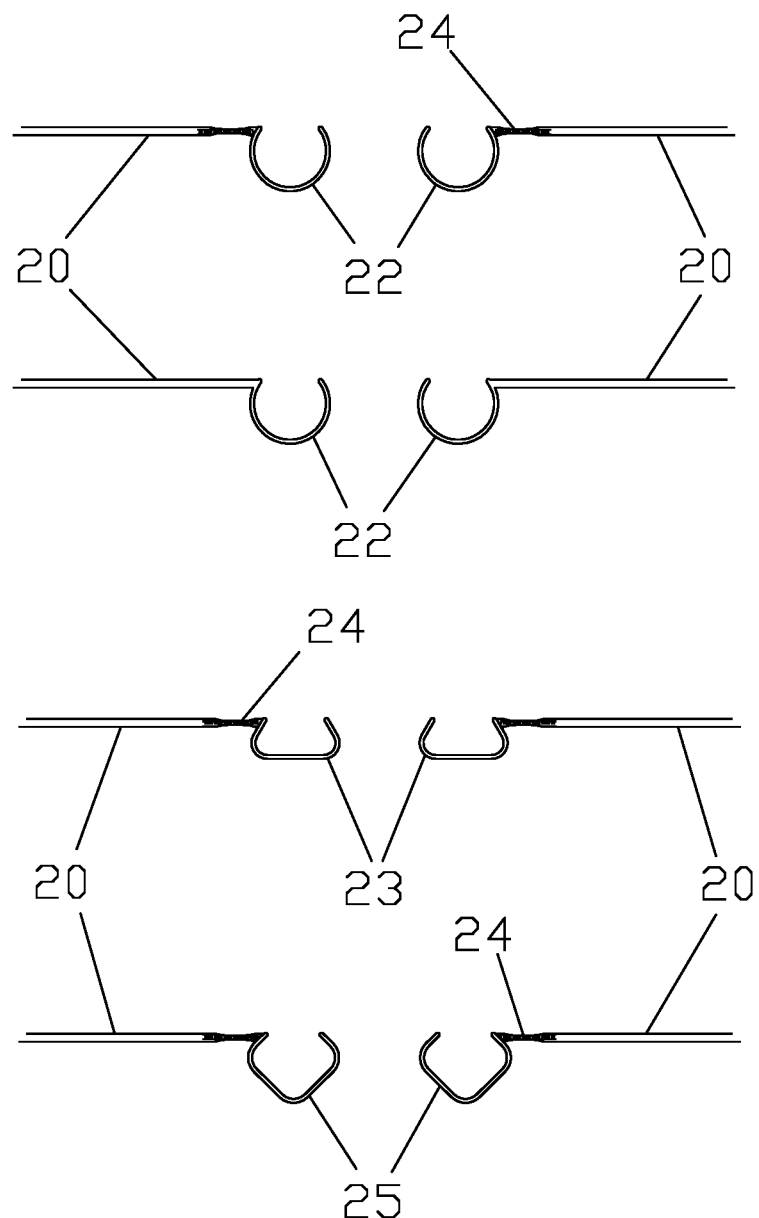
FIG. 2 is a cross-sectional view of three pairs of grooves connecting to living hinges and panel edges, and one pair of grooves connecting to panel edges.

Another embodiment of my modular panel interlocking mechanism is illustrated in FIG. 2 in a detailed and close up view on the various groove types and grooves 22 attachments to panels 20 with or without living hinge 24 connections. A cross sectional view on all types of grooves 22 along the panel edges in my interlocking mechanism appear with certain commonalities: the outer width near or at the openings is smaller than the inner width of the grooves 22, either in a round shape, triangular shape, or diamond shape. The reason for the designs above is that one groove is compressed to interact with the other that is expanded, then holding each other for interlocking by the smaller opening and both sides of outer groove 22 pointing inward, whether they are in round, triangle or diamond shapes.

FIG. 2 discloses a pair of round grooves 22 with openings on the top that each connects through living hinges 24 to a panel 20. The pair of round grooves 22 are identical to each other in configuration, and either one is ready to be mutually interlocked. FIG. 2 discloses a pair of round grooves with openings on the top 22 that each connects directly to a panel 20. The pair of round grooves 22 are identical to each other in configuration, and either one is ready to be pressed into the other for interlocking. FIG. 2 discloses a pair of triangle grooves with openings on the top 22 that each connects through a living hinge 24 to a panel 20. The pair of triangle grooves 23 are identical to each other in configuration, and either one is ready to be pressed into the other for interlocking. FIG. 2 discloses a pair of diamond grooves 25 that each connect through a living hinge 24 to a panel 20. The pair of diamond grooves 25 are identical to each other in configuration, and either one is ready to be pressed into the other for interlocking.

Figure 3:
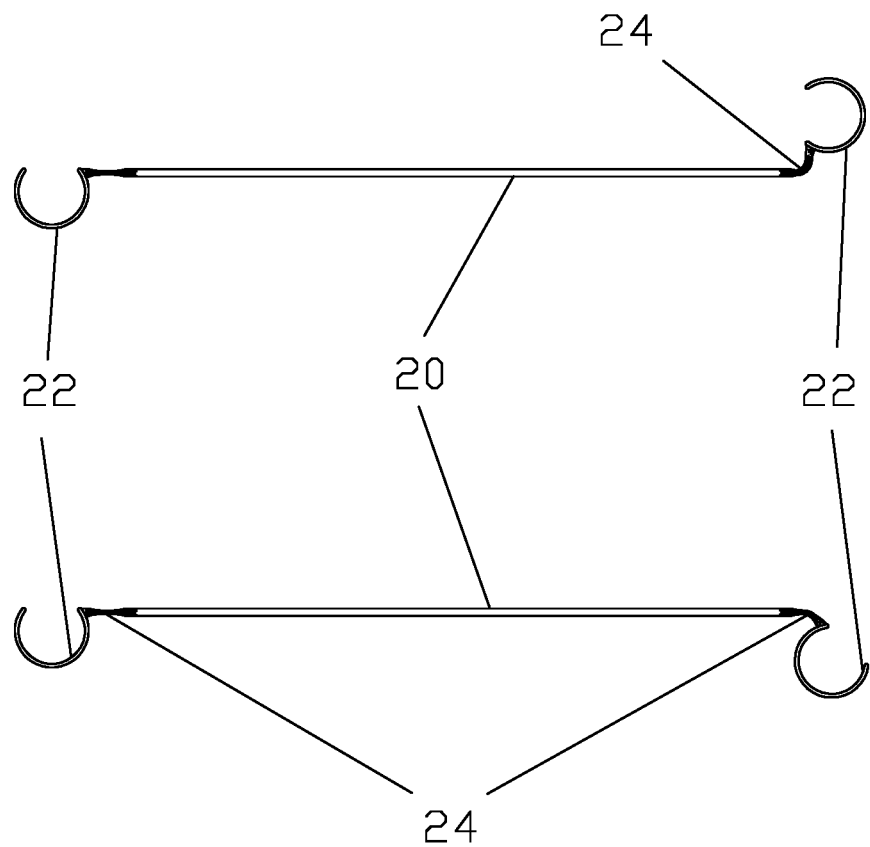
FIG. 3 is a cross-sectional view of panels with grooves on both edges of the panels. The second panel contains no living hinges, and others contain grooves at a rotated angle on living hinges.

Another embodiment of my modular panel interlocking mechanism is illustrated in FIG. 3. Each edge of a panel 20 integrally connects to a living hinge 24 that also connects to a groove 22. A living hinge 24 is a flexible hinge that allows one side of an attachment to turn on it and form a dihedral angle between two side attachments of the living hinge 24. The living hinge 24 device incorporated in my groove 22 interlocking mechanism is the key to allow panels to connect and interlock both flat and in a dihedral angle. In the case of a box assembly, modular panels 20 are able to connect themselves to bigger flat surface areas or over ninety degree dihedral corners under the assistance of living hinges 24.

FIG. 3 discloses a panel 20 that shows that each edge integrally connects a living hinge 24 which also connects to a groove 22. One groove 22 and living hinge 24 stays flat with the panel 20 and the groove 22 on the other end turns ninety degrees up on the living hinge 24. One groove 22 and living hinge 24 stays flat with the panel 20 and the groove 22 on the other end turns forty five degrees down on the living hinge 24.

Figure 4A:
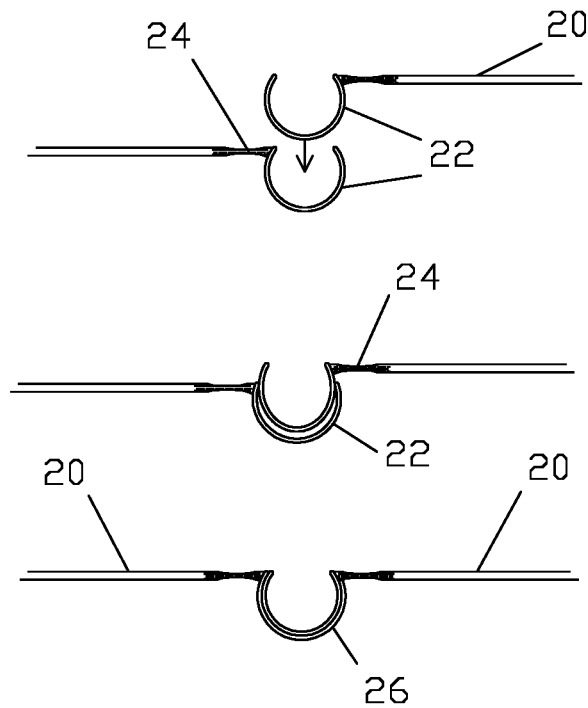
FIG. 4A is a cross-sectional view of the groove interlocking processes on a flat surface, with the right groove being pressed into the left groove. During the interaction in the process, the right groove is compressed narrower and the left groove is expanded wider.
Figure 4B:
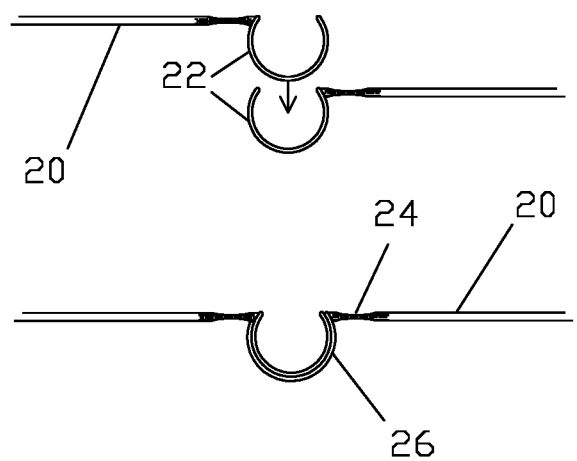
FIG. 4B is a cross sectional view of the groove interlocking process on a flat surface with the left groove pressed into the right groove.
Figure 4C:
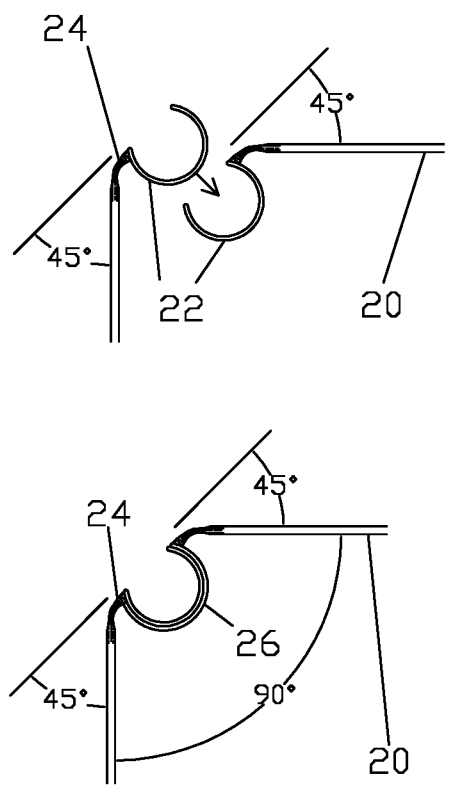
FIG. 4C is a cross sectional view of both left and right grooves turned on the living hinge at 45 degrees, forming a right angled dihedral corner for the two panels.

Another embodiment of my modular panel interlocking mechanism is illustrated in FIG. 4A, FIG. 4B, and FIG. 4C. The grooves 22 have the same configuration and are made in a desired flexibility. From a cross sectional view of the groove 22, the design specifies that the width towards of the outer opening is smaller than the inner width of the groove 22. Any of these grooves 22 can be pressed into another, thereby forming an aligned channel (as best depicted in FIG. 4A). The aligned channel may receive, for example, one of the reinforcing rods 30, reinforcing grooves 32, cross reinforcing rods 34, and dihedral corner reinforcing pieces 36 as discussed in more detail below. Both sides of the outer groove opening point inward and hold the inner groove 22 in, thus generating a mutual tightening holding structure. Because each groove 22 is attached to a panel 20, this mutual tightening structure becomes the interlocking mechanism for the panels 20. During the process of connecting the grooves 22, the inner groove 22 is compressed while the outer groove 22 expands. When they are detached, the grooves 22 return to their original shape.

FIG. 4A discloses that the groove 22 attached to the panel 20 on the right is being pressed into the groove 22 that is attached to the panel 20 on the left. During the process, the groove 22 on the right is compressed while the groove 22 on the left expands. Then the groove 22 on the right is held in the groove 22 on the left.

FIG. 4B discloses that the groove 22 on the left is pressed into the groove 22 on the right. Then the groove 22 on the left is held in the groove 22 on the right.

FIG. 4C discloses that the groove 22 turning forty five degrees on the living hinge 24 on the left is pressed into the groove 22 turning forty five degrees on the living hinge 24 on the right. Then the groove 22 on the left is held in the groove 22 on the right, forming the ninety degree dihedral angle between the two panels 20.

Figure 5:
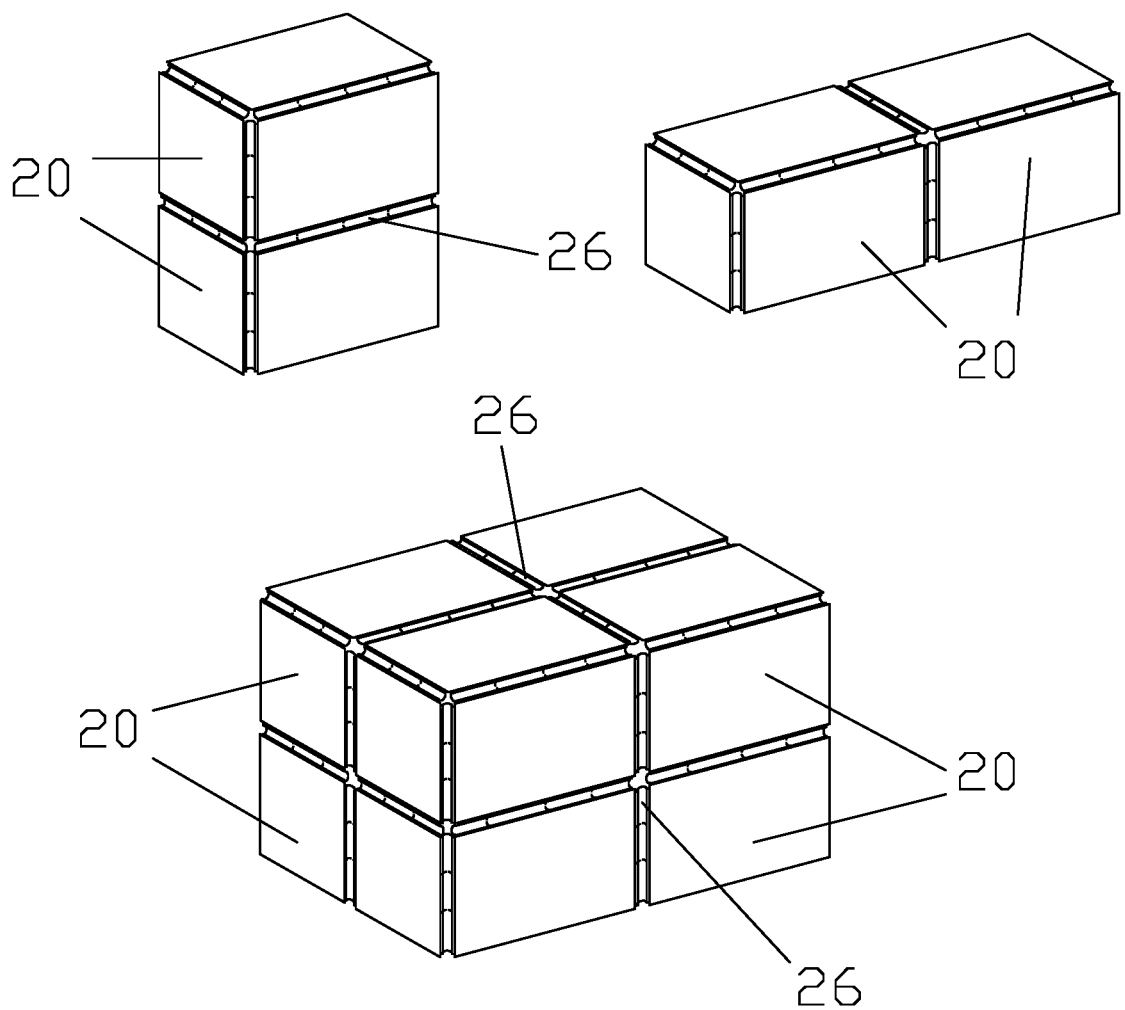
FIG. 5 is an elevated view of more boxes in various sizes and dimensions that can be built by a plurality of panels in the same dimension.

Another embodiment of my modular panel interlocking mechanism is illustrated in FIG. 5. Modular panels 20 attached with living hinges 24 and grooves 22 on all four side edges are designed to interlock with other panels 20.

FIG. 1 discloses the detailed interlocking method for assembling a box 21 by using six modular panels attached with living hinges and grooves. My modular panel interlocking mechanism not only allows six modular panels to form a box 21, but also to form a bigger box 21 with wider sides, longer corners, and desired dimensions with more modular panels 20. The versatility in assembling different sized boxes 21 is made possible by creating flat and over angled dihedral corners with grooves 22 and living hinges 24.

FIG. 5 discloses a taller box 21 assembled from ten modular panels 20 either interlocked flat or over right angle corners. A longer box 21 is assembled from ten modular panels 20 either interlocked flat or over right angle corners. Another box 21 in greater size is assembled from twenty four modular panels 20 either interlocked flat or over right angle corners.

Figure 6:
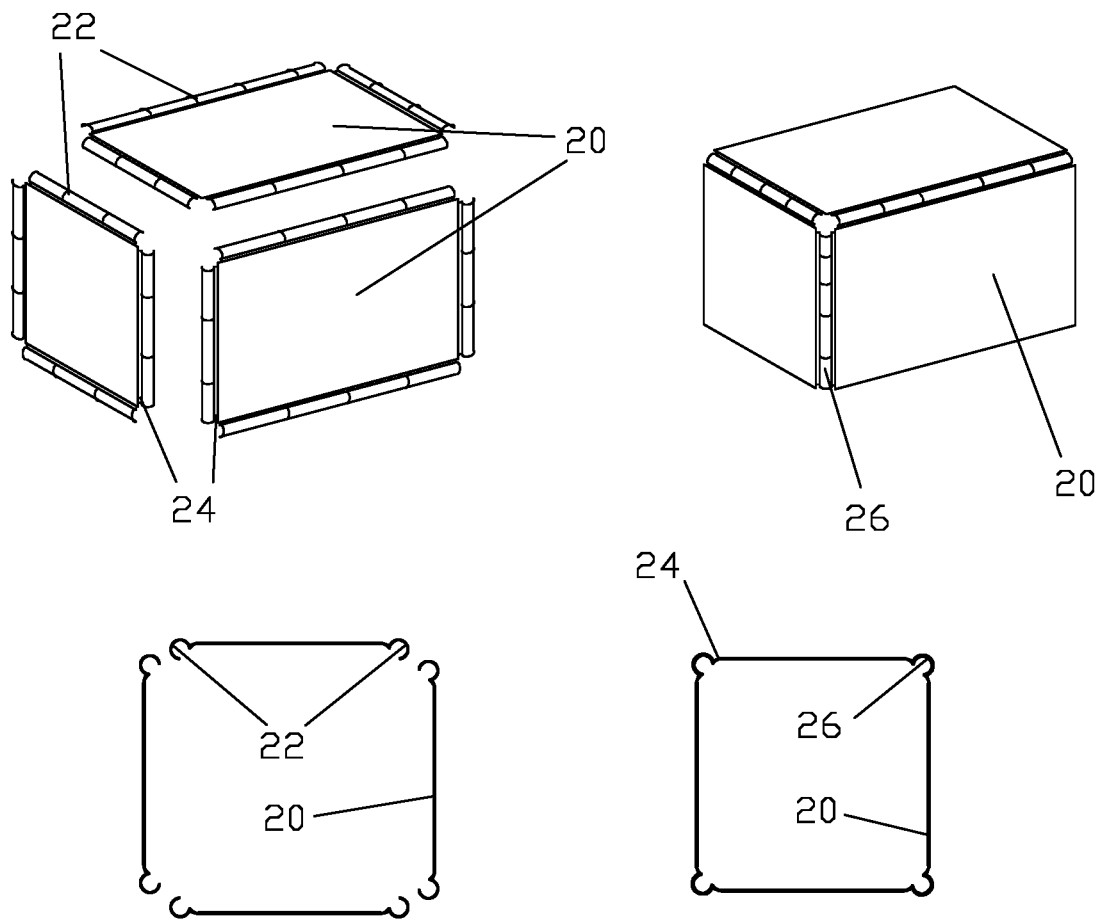
FIG. 6 is an elevated view of panels with grooves facing inward, an assembled box with panels and grooves with openings that face inward, and a cross sectional view of panels with grooves facing inward before and after the box assembly.

Another embodiment of my modular panel interlocking mechanism is illustrated in FIG. 6. Modular panels 20 attached with living hinges 24 and grooves 22 on four edges are interlocked together to form a box 21. The openings of grooves 22 face inward for interlocking. FIG. 6 discloses three panels for the box's top, front, and left to form a partial box viewable only at the top and front. The cross sectional view on the four panels reveals four panels with grooves facing inward interlock each other at the corners, completing the square enclosure with openings of all interlocked groove 26 facing inward.

Figure 7:
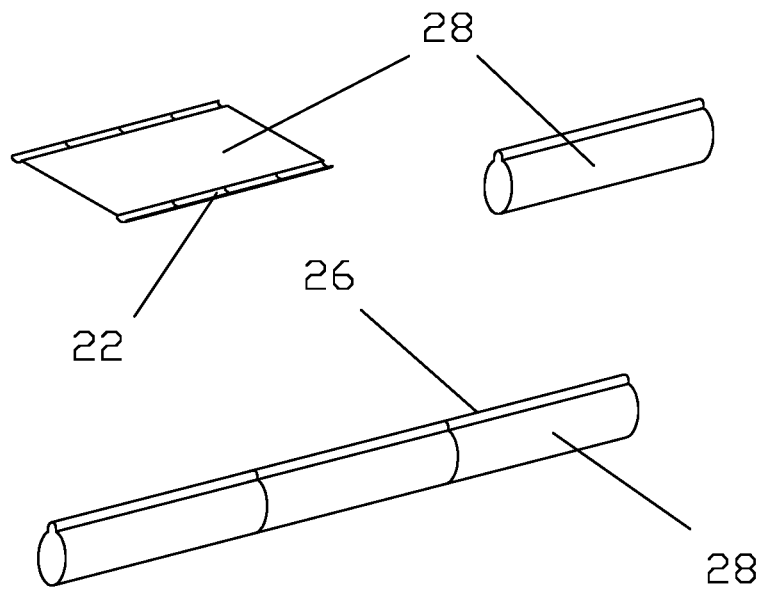
FIG. 7 is an elevated and a cross sectional view of a flexible panel with two grooves on the edges to form a tubular case and an extended tubular case.
Figure 7:
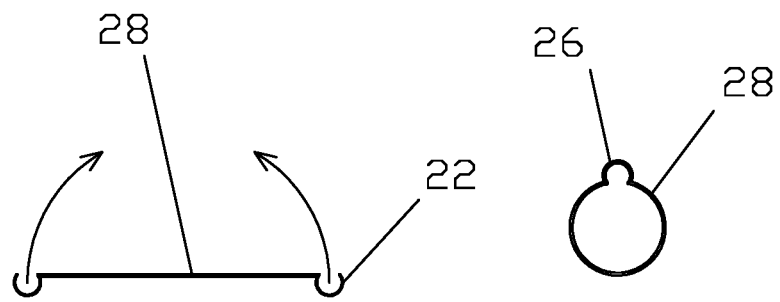

Another embodiment of my modular panel interlocking mechanism is illustrated in FIG. 7. A flexible panel 28 with a groove attached to each of the two edges can be rolled up into a tubular case 29 and fastened in the stable tubular configuration by interlocking the two groves 22 to each other. The width between two grooves 22 on the flexible panel 20 will determine the diameter of the tubular case 29. Several tubular cases 29 can overlap at the ends with interlocked grooves 22 further interlocking and overlapping, extending the length of the tubular case 29.

FIG. 7 discloses a flexible panel 20 with two grooves 22 attached to the edges, rolled up and interlocked by grooves, forming the tubular case 29. Several tubular cases 29 overlap at the ends to create a longer tubular case 29.

Another embodiment of my modular panel interlocking mechanism is illustrated in FIG. 8. When assembled boxes 21 are stacked up or take heavy loads of products, assembled boxes 21 are under stress or pressure which tends to deform the boxes 21. For boxes 21 assembled from rigid panels 20 attached with living hinges 24 and groves 22, the more critical areas that need reinforcement are the dihedral corners, trihedral corners, interlocking grooves 26, and interlocking groove cross line joints. In case extra reinforcement is needed to enhance the strength on the boxes 21, my mechanism offers simple methods and devices for the purpose by using reinforcing rods 30, reinforcing grooves 32, cross reinforcing rods 34, and dihedral corner reinforcing pieces 36.

Figure 8A:
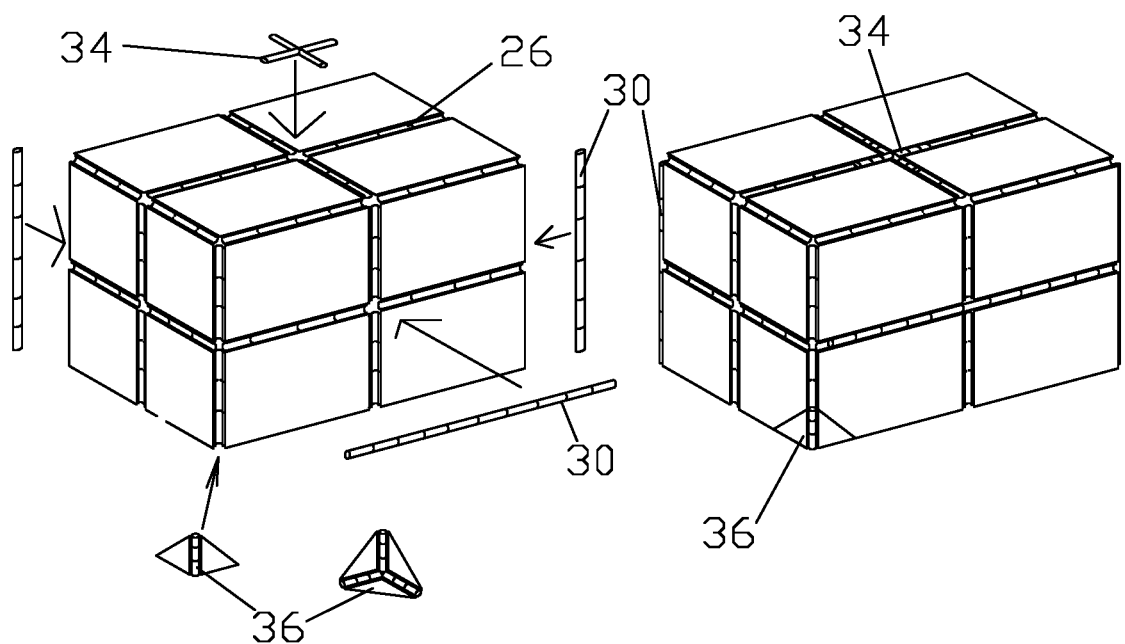
FIG. 8A is an elevated view of a hinge and groove panel assembled box with additional designs of reinforcement which includes reinforcing rods, a cross reinforcing rod, and a trihedral corner reinforcing piece.

FIG. 8A discloses reinforcing rods 30 embedded in corner interlocked grooves 26 and flat interlocked grooves 26 to enhance the box strength. A cross reinforcing rod 34 is simultaneously embedded in four partial interlocking grooves 26 at the cross line joint to enhance the box strength. A trihedral corner reinforcing piece 36 has three self-attached rods located at the three trihedral lines. The three self-attached rods simultaneously get in three trihedral interlocked grooves 26 lined to the corner to enhance the box strength.

Figure 8B:
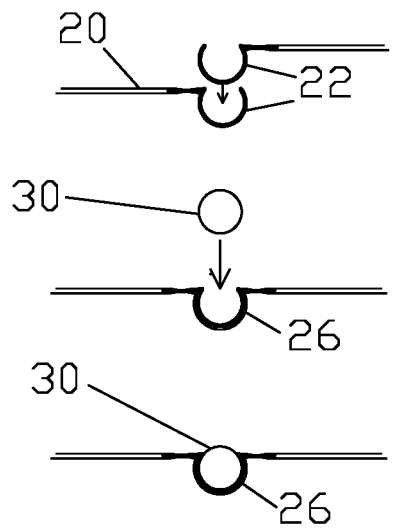
FIG. 8B is a cross section view of the mechanism where the reinforcing rod is embedded in the interlocked grooves and held in place, enhancing the groove structure.

FIG. 8B discloses a reinforcing rod 30 in a similar diameter to the round grooves 22, embedded in interlocked grooves 26 and held in the grooves 22 by the smaller opening of the grooves 22 and both sides of the opening pointing inward. The flexibility of the grooves 22, the tight contacts among grooves 22, and the reinforcing rod 30 hold the components tightly together which enhances the box strength.

Figure 8C:
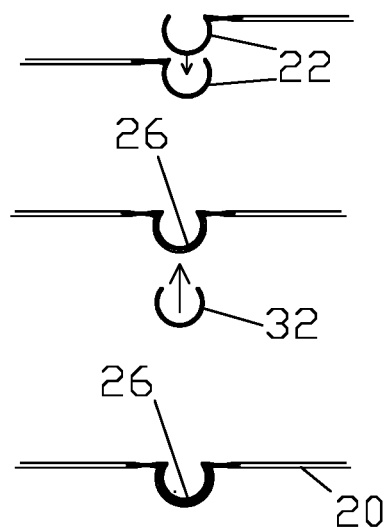
FIG. 8C is a cross section view of the mechanism where the additional reinforcing groove is pressed unto the interlocked grooves and held in place, enhancing the groove structure.

FIG. 8C discloses a reinforcing groove 32 in a similar configuration to the interlocked grooves 26 pressed onto the interlocked grooves 26, and held tightly among all three grooves 22 in place, thus enhancing the box strength and durability.

Figure 9:
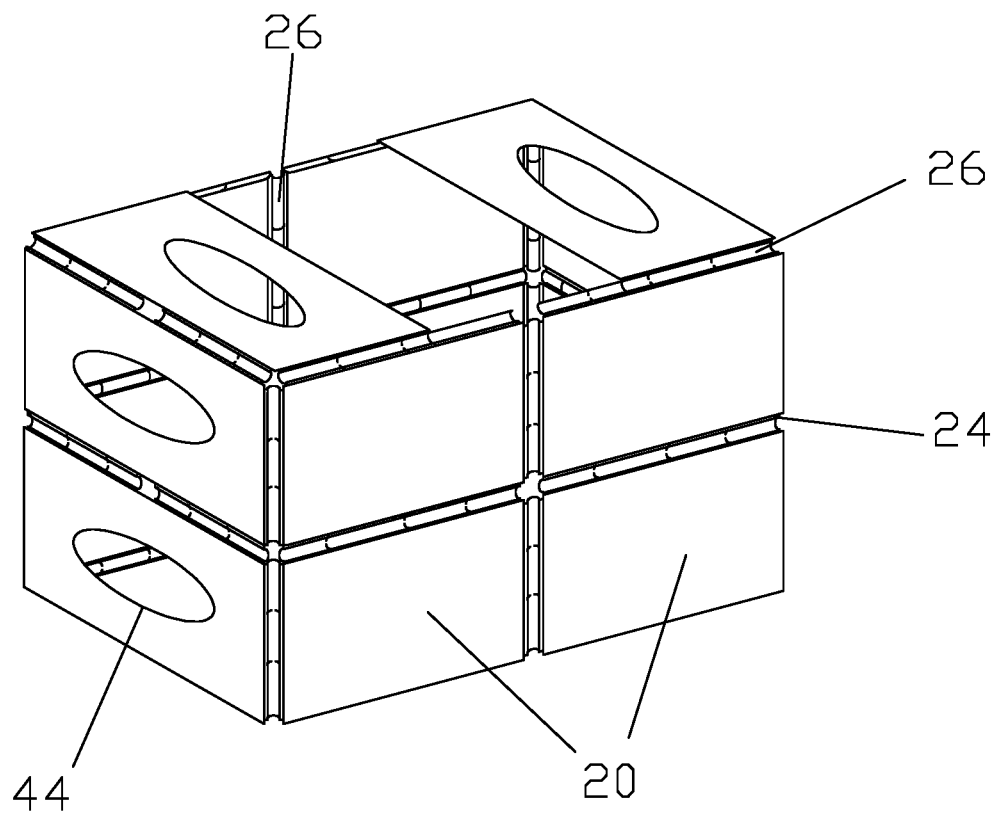
FIG. 9 is an elevated view of the assembled box with panels with and without oval openings. The opening panels that are located on the sides of the box function as ventilation ports and handles for the box.

Another embodiment of my modular panel interlocking mechanism is illustrated in FIG. 9. For assembled boxes 21 that do not need to be completely closed enclosures, certain areas can be absent of interlocked panels 20. Those panels 20 can be made with opened areas on the panel bodies with oval openings 44 that can also be used as box handles 44. FIG. 9 discloses an assembled box 21 where a panel 20 at the top is absent.

Figure 10:
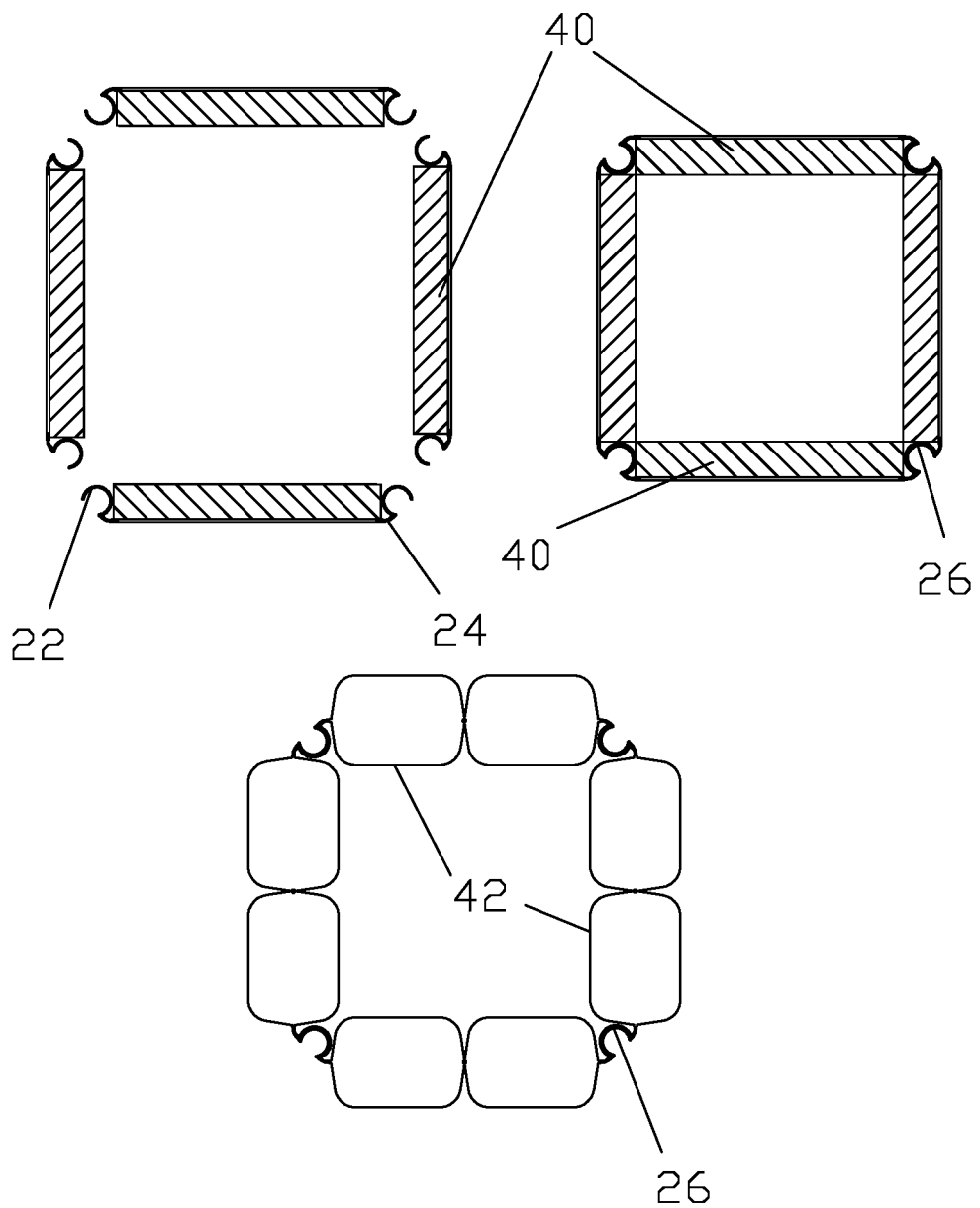
FIG. 10 is a cross sectional view of insulation or cushion enclosures before and after assembly, and assembled air cushion by using groove and living hinge designs.

Another embodiment of my modular panel interlocking mechanism is illustrated in FIG. 10. The panels 20 used for building boxes can come in various forms aside from rigid and flexible 20. Panels with insulation or cushion 40 can also be attached with living hinges 24 and grooves 22 on the edges to form an enclosure that is insulated or cushioned all the way around. Air cushions 42 can also be attached with living hinges 24 and grooves 22 on the ends to form an air cushion enclosure. FIG. 10 discloses an insulated or cushioned enclosure assembled from panels with insulation or cushion 40 by interlocking grooves 22 turning on living hinges 24 for all corners. FIG. 10 also discloses an air cushion 42 enclosure assembled by interlocking grooves attached to them.

Figure 11:
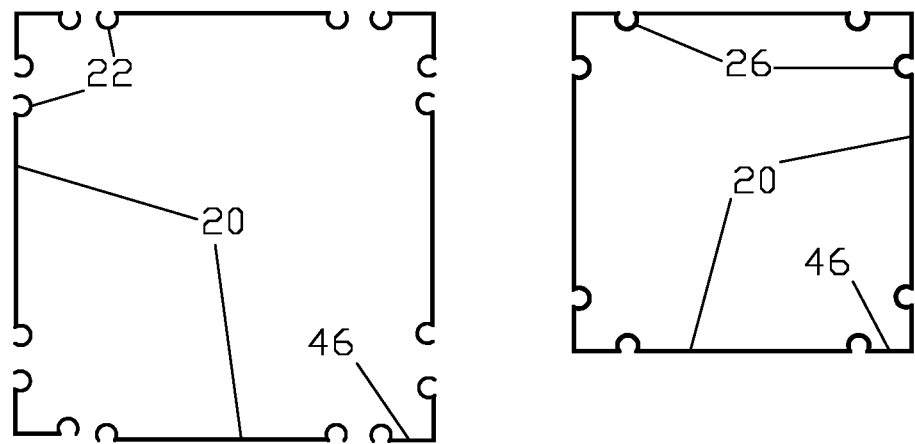
FIG. 11 is a cross sectional view of enclosures with corner connectors and grooves before and after the enclosure assembly with panels attached with grooves facing inward or outward.
Figure 11:
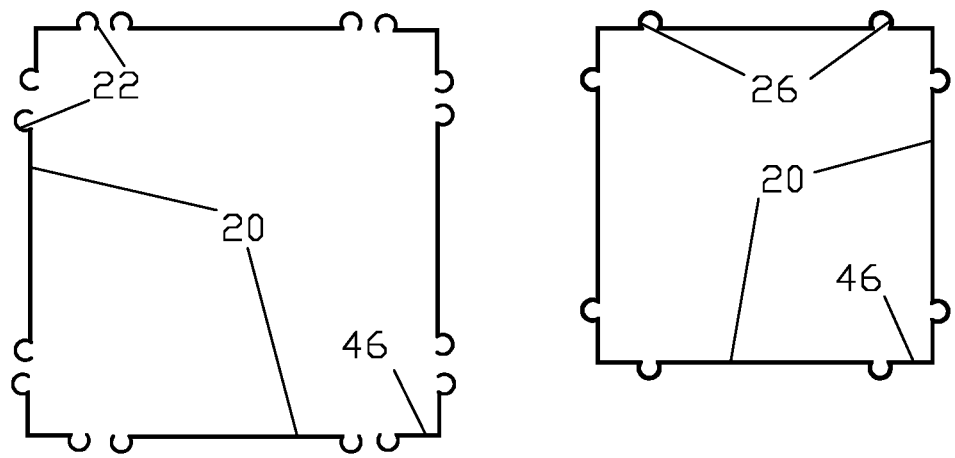

Another embodiment of my modular panel interlocking mechanism is illustrated in FIG. 11. Dihedral corner pieces with grooves 46 are connectors for angle transitioning at a dihedral angle for panels 20 with grooves 22. By interlocking panel grooves 22 and corner pieces with grooves 46, an enclosure is assembled. FIG. 11 discloses right angle corner pieces with groove 46 openings facing outward and panels 20 attached with grooves 22 on edges, which are assembled to build an enclosure in a cross sectional view. FIG. 11 also discloses right angle corner pieces with groove 46 openings facing inward and panels 20 attached with grooves 22 on edges, which are assembled to build an enclosure.

Figure 12:
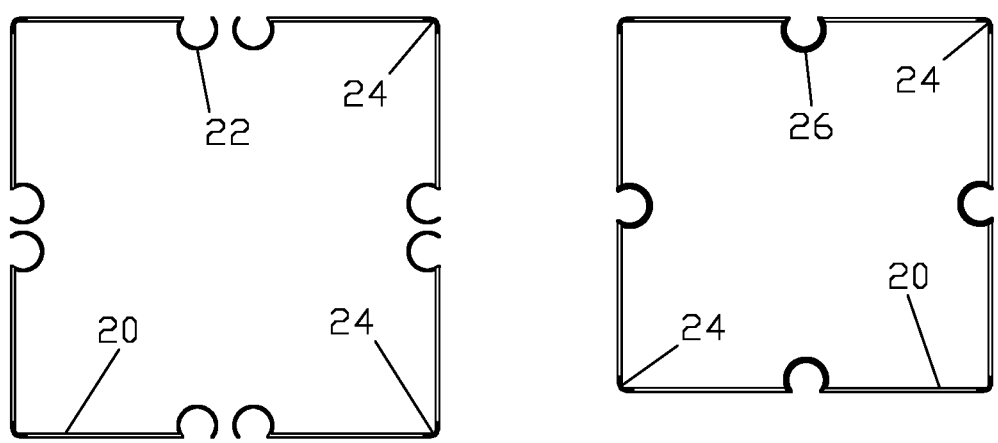
FIG. 12 is a cross sectional view before and after the assembly with panels equipped with grooves on the edges and living hinges in the middle. The interlocked grooves are at the middle of box's sides and the living hinges are at the box's dihedral corners.

Another embodiment of my modular panel interlocking mechanism is illustrated in FIG. 12. The living hinges 24 are located in the middle of the panels 20 while grooves 22 are attached to the edges of the panels 20. By using the living hinges 24 to transit the dihedral corner angle from one side to another and interlocking grooves 22, an enclosure is formed. FIG. 12 discloses panels 20 turning on a right angle on living hinges 24 in the middle and interlocking grooves 22 attached to edges of panels 20. Panels 20 with living hinges 24 in the middle are used to build a square enclosure.

Figure 13:
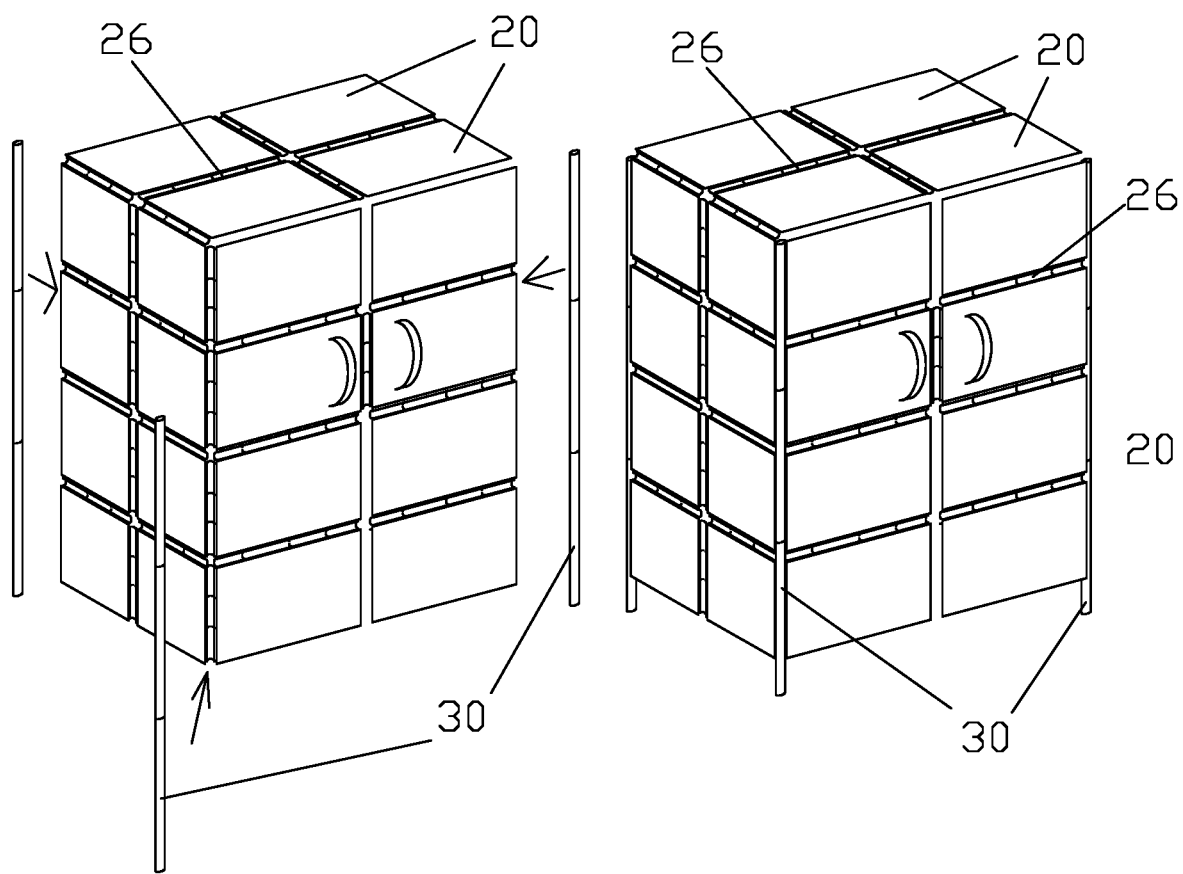
FIG. 13 is an elevated view of an assembled closet built with modular panels and further strengthened with reinforcing rods embedded in vertical corners. The reinforcing rods protrude downwards servicing as legs supporting and elevating the assembled closet on the floor.

An additional embodiment of my modular panel interlocking mechanism is illustrated in FIG. 13. Many pieces of furniture, such as a closet, have a rectangular shape. The closet can be assembled by modular panels 20. To further strengthen the structure, reinforcing rods 30 are embedded in interlocked grooves 26. One additional benefit of interlocking the reinforcing rods 30 to the interlocked grooves 26 is that by extending the length of reinforcing rods 30 evenly, all the reinforcing rods 30 become supporting legs for the closet. FIG. 13 illustrates a closet assembled from modular panels 20 with reinforcing rods 30 embedded in interlocked grooves 26. The reinforcing rods 30 in the vertical grooves 26 extend longer to support the closet as furniture legs.

Figure 14:
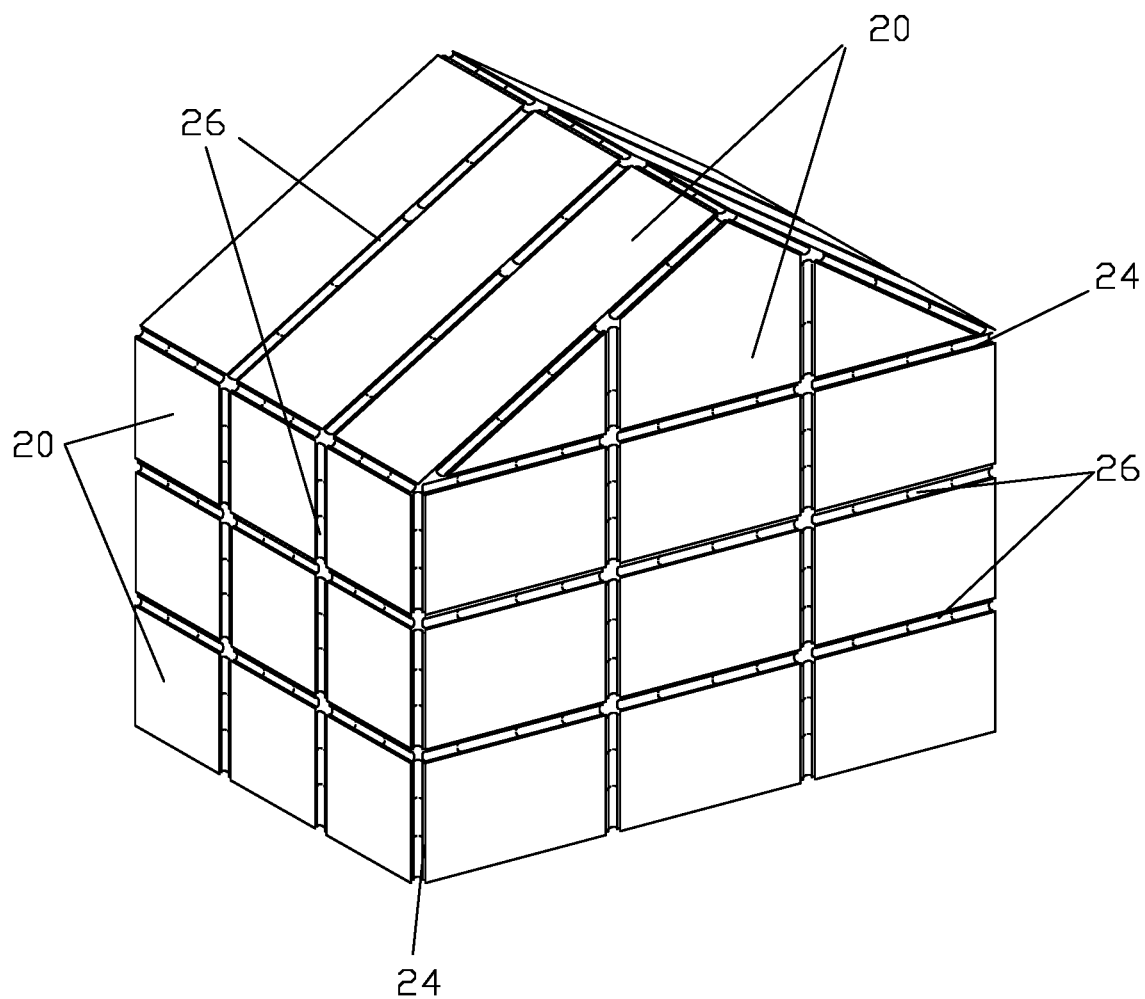
FIG. 14 is an elevated view of a house built with modular panels that are attached with interlocking grooves.

A ramification of the above embodiment of my modular panel interlocking mechanism is illustrated in FIG. 14. A plurality of specific modular panels 20 with interlocked grooves 26 is assembled together to construct a house or an inner hollow object resembling a house. A house is an enclosure constructed with specifically designed panels 20. FIG. 14 discloses a house assembled with a plurality of modular panels by interlocked grooves 26 on living hinges 24.

Another ramification of the above embodiment of my modular panel interlocking mechanism is illustrated in FIG. 15. A plurality of modular panels 20 with interlocking grooves 22 is assembled into a toy vehicle which is a closed enclosure. The toy vehicle includes toy wheels 49 that are connected by reinforcing rods 30 on both ends. The reinforcing rods 30 are embedded in interlocked grooves 26 under the assembled toy vehicle, exposing the toy wheels 49 on both sides of the toy vehicle.

Advantages
a) Panels in a limited number of sizes and designs can be assembled into boxes of various sizes.
b) Modular panels with grooves and living hinges allow the panels to interlock a flat pattern, dihedral pattern, and trihedral angle pattern without any additional components.
c) My mechanism makes panel assembly and disassembly simple to conduct by hands or by mass production.
d) Modular panels can be designed, produced, and marked into various classifications and standards such as light, regular, heavy or super heavy duty, or for purposes in various industries such as food contact grade, chemical contact grade, etc.
e) As an alternative to cardboard boxes, plastic panels under my mechanism save enormous amounts of energy and water in comparison to cardboard boxes.
f) My panel interlocking mechanism makes it possible to reuse and circulate boxes in society and industries repetitively, saving millions of acres of trees from being chopped down to produce cardboard boxes.
g) Replacing cardboard boxes is more eco-friendly because it reduces $CO_2$ emissions and other gas, water, and land pollutant emissions enormously.
h) Panels and boxes under my mechanism are lightweight, strong, sleek, and easy to clean. It is more economical than the use of cardboard boxes.
i) My design is quite versatile. The panels can be made of a variety of materials such as insulation, cushions, metals, plastics, composites, etc. Additionally, the panels can be used to assemble toys, furniture, housings, partitions, etc.
j) As completely novice and practical designs, my mechanism helps introduce new product lines including crates, containers, toys, furniture, buildings and products never easily assembled before.

CONCLUSION, RAMIFICATIONS, AND SCOPE

Accordingly, the reader will see that the panel interlocking mechanism for building enclosures is simple, convenient, and practical. Substituting cardboard boxes with my panels can cut down on pollution and preserve a great deal of precious natural resources. It also becomes more economical for consumers and businesses while generating new product lines.

Although the description above contains many specificities, these should not be construed as limiting the scope of the embodiments but as merely providing illustrations of some of several embodiments. For instance, the reinforcing rod can be modified to include a cover to smooth out the outer surface. The mechanism allows panels to connect into flat or curved surfaces instead of enclosures. Panels don't necessarily have to be rigid, they can be soft sheets and rolled. Other additions on panels can include cushions, double panels, corrugated panels, multiple layers, construction materials, etc. Building permanent structures is within reach by using my mechanism and further fastening the grooves together by bolts or glue or many other fastening devices. Modular panels can also be in shapes beyond rectangle or square; they can be triangular, circular, circular sector, or many other shapes. They can also be a combination of panels connected by creases or hinges for folding up and building an enclosure by interlocking at key structural points under my mechanism.

The grooves attached to panel edges can also come in various forms or shapes other than continuous. Some possibilities include sectional or even in shape of pits, or buttons along the panel edges, so long as the interlocking mechanism on panels has similar configurations. Therefore, the scope of the embodiments should be determined by the appended claims and their legal equivalents, rather than by the examples given.

Accordingly what is claimed is:

1. A modular panel building enclosure comprising:
a plurality of panels each:
  enclosed by a plurality of sides each having a perimeter edge defining a perimeter length; and
  at least one C-shaped enclosed groove with an inner width and coupled to and substantially spanning the perimeter length of the perimeter edge of each of the respective plurality of sides enclosing the respective plurality of panels, the plurality of panels are removably coupled together along the respective perimeter lengths of each of the respective plurality of sides to form an enclosure through an interlocking groove configuration, wherein the interlocking groove configuration includes one of the least one C-shaped enclosed grooves in the interlocking groove configuration in a compressed state with the inner width narrower than the inner width of the another of the least one C-shaped enclosed groves in the interlocking groove configuration and in an expanded state caused by the interlocking groove configuration.

2. The modular panel building enclosure according to claim 1, further comprising:
at least one flexible living hinge substantially spanning and coupled to each perimeter edge of each of the respective plurality of sides of the respective plurality of panels, the at least one C-shaped enclosed groove directly coupled to a terminal end of each of the at least one flexible living hinge and substantially spanning the perimeter length of each of the respective plurality of sides of the respective plurality of panels.

3. The module panel building enclosure according to claim 2, wherein:
each of the plurality of panels are substantially planar.

4. The module panel building enclosure according to claim 2, wherein:
each of the at least one flexible living hinge is operably configured to flexibly bend in a 45-degree angle.

5. The module panel building enclosure according to claim 2, wherein the interlocking groove configuration further comprises:
an aligned channel defined by each of the at least one of C-shaped enclosed grooves spanning the length of the perimeter edge of each of the respective plurality of sides of the respective plurality of enclosed panels.

6. The module panel building enclosure according to claim 5, wherein the interlocking groove configuration further comprises:
a reinforcing rod removably disposed within the aligned channel.

7. The modular panel building enclosure according to claim 1, wherein each of the at least one C-shaped enclosed grooves further comprise:
an opening defined thereon, the opening defining an outer width smaller than an inner width of the enclosed groove.

8. A modular panel building enclosure comprising:
a plurality of panels having an assembled configuration, a disassembled configuration, and each having:
  a plurality of sides each having a perimeter edge;
  at least one flexible living hinge operably configured in the assembled configuration to flexibly bend in a 45-degree angle and substantially spanning and coupled to each perimeter edge of each of the respective plurality of sides of the respective plurality of panels; and
  at least one enclosed and open-faced groove with an inner width and directly coupled to a terminal end of each of the at least one flexible living hinge and substantially spanning a length of the perimeter edge of each of the respective plurality of sides of the respective plurality of panels, the assembled configuration including the plurality of panels removably coupled together along the perimeter edge of each of the respective plurality of sides to form an enclosure defining an enclosed volume through an interlocking groove configuration, wherein the interlocking groove configuration includes one of the at least one enclosed and open-faced groove in the interlocking groove configuration in a compressed state with the inner width narrower than the inner width of the another of the least one enclosed and open-faced grooves in the interlocking groove configuration and in an expanded state caused by the interlocking groove configuration and includes the open-faced groove facing outwardly from the enclosed volume.

9. The modular panel building enclosure according to claim 8, wherein:
all of the enclosed and open-faced grooves are identically shaped with respect to one another in the disassembled configuration.

10. The modular panel building enclosure according to claim 8, wherein
each of the at least one enclosed and open-faced grooves is arcuate.

11. The modular panel building enclosure according to claim 10, wherein each of the plurality of panels further comprise:
an upper surface and bottom surface opposing the upper surface, the bottom surface of each of the plurality of panels collectively define an enclosed box volume when in the assembled configuration, wherein each of the least one arcuate, enclosed, and open-faced grooves are openly faced outwardly in a direction away from the enclosed box volume when in the assembled and interlocking groove configurations.

12. The modular panel building enclosure according to claim 8, wherein each of the at least one enclosed and open-faced grooves further comprise:
an opening defined thereon, the opening defining an outer width smaller than an inner width of the enclosed and open-faced groove.

* * * * *